(12) United States Patent  
Heisey

(10) Patent No.: US 9,216,670 B2  
(45) Date of Patent: Dec. 22, 2015

(54) CHILD RESTRAINT SYSTEM

(71) Applicant: Dorel Juvenile Group, Inc., Foxboro, MA (US)

(72) Inventor: Nathan W Heisey, Seymour, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/811,175

(22) Filed: Jul. 28, 2015

(65) Prior Publication Data

US 2015/0329016 A1    Nov. 19, 2015

Related U.S. Application Data

(63) Continuation of application No. 14/630,066, filed on Feb. 24, 2015, now Pat. No. 9,119,483.

(60) Provisional application No. 61/952,981, filed on Mar. 14, 2014.

(51) Int. Cl.
*B60B 7/00* (2006.01)
*B60N 2/28* (2006.01)
*B62B 7/14* (2006.01)

(52) U.S. Cl.
CPC ............ *B60N 2/2845* (2013.01); *B60N 2/2821* (2013.01); *B62B 7/145* (2013.01)

(58) Field of Classification Search
CPC .............. B62B 7/00; B62B 7/08; B62B 7/12; B62B 9/22
USPC ................... 280/47.34, 30, 643, 47.41, 47.38
See application file for complete search history.

(56) References Cited

U.S. PATENT DOCUMENTS

| | | | |
|---|---|---|---|
| 4,632,409 A | 12/1986 | Hall et al. | |
| 5,326,067 A * | 7/1994 | Gonzalez | B60N 2/01583 248/127 |
| 5,820,144 A | 10/1998 | Wang | |
| 6,070,890 A * | 6/2000 | Haut | B60N 2/2821 280/30 |
| 6,260,920 B1 | 7/2001 | Tolfsen | |
| 6,331,032 B1 * | 12/2001 | Haut | B60N 2/2821 280/30 |
| 6,446,990 B1 | 9/2002 | Nania et al. | |
| 6,979,057 B2 * | 12/2005 | Sedlack | A47D 13/02 297/250.1 |
| 8,676,498 B2 * | 3/2014 | Ma | G01C 21/165 345/633 |
| 8,876,208 B2 * | 11/2014 | Heisey | B60N 2/2827 297/130 |
| 2013/0154239 A1 | 6/2013 | Longenecker et al. | |
| 2013/0154323 A1 | 6/2013 | Longenecker et al. | |

FOREIGN PATENT DOCUMENTS

DE     4111010 A1    1/1992

* cited by examiner

*Primary Examiner* — John Walters
*Assistant Examiner* — James Triggs
(74) *Attorney, Agent, or Firm* — Barnes & Thornburg LLP

(57) ABSTRACT

A child restraint system includes an infant carrier and a base adapted to be mounted on a passenger seat in a vehicle in a vehicle mode. The infant carrier is also configured to be mounted on a stroller frame in a stroller mode. The infant carrier includes a seat shell and a carrying handle coupled to the seat shell.

24 Claims, 7 Drawing Sheets

CHILD RESTRAINT SYSTEM

PRIORITY CLAIM

This application claims benefit under 35 U.S.C. §120 of an earlier filing date of U.S. application Ser. No. 14/630,066, filed Feb. 24, 2015, which claims priority under 35 U.S.C. §119(e) to U.S. Provisional Application Ser. No. 61/952,981, filed Mar. 14, 2014, which is expressly incorporated by reference herein.

BACKGROUND

The present disclosure relates to child restraints and, in particular, to an infant carrier that can be mounted on an underlying base held in place on a passenger seat of a vehicle. More particularly, the present disclosure relates to a system for anchoring an infant carrier to an underlying base in one mode and to a stroller frame in another mode.

SUMMARY

According to the present disclosure, a child restraint system includes a base adapted to set on a passenger seat in a vehicle and an infant carrier. In illustrative embodiments, the infant carrier can be mounted in a stationary position either on the base or on a stroller frame.

In illustrative embodiments, the infant carrier includes a seat shell, a front shell anchor, and a rear shell anchor. The front and rear shell anchors are used to mate the seat shell to an underlying base that is adapted to set on a vehicle seat. In contrast, only the rear shell anchors are used to mate the seat shell to a stroller frame to form a seat in a juvenile stroller. The front shell anchor is coupled to the seat shell for pivotable movement about an anchor-pivot axis relative to the seat shell between a base-mating position engaging the base to hold a front portion of the seat shell on the base and a base-releasing position disengaging the base to free the front portion of the seat shell to be separated from the base. The rear shell anchor is coupled to the seat shell and is arranged to lie in spaced-apart relation to the front shell anchor and configured to move laterally along an anchor-movement line relative to the seat shell between a base/stroller-mating position engaging either the base or the stroller and base/stroller-releasing position disengaging the base and the stroller.

In illustrative embodiments, the child restraint further includes an anchor controller coupled to the seat shell. The anchor controller can be moved by a caregiver back and forth relative to the seat shell between a locked position in which the front shell anchor is in the base-mating position engaging the base and the rear shell anchor is in the base/stroller-mating position engaging either a base or a stroller frame and an unlocked position in which the front shell anchor is in the base-releasing position disengaging the base and the rear shell anchor is in the base/stroller-releasing position disengaging either the base or the stroller.

In illustrative embodiments, the anchor controller includes a release handle, an anchor-mover link, and an anchor-pivot link. The anchor-mover link is arranged to extend between and interconnect the release handle and the anchor-pivot link to cause the anchor-mover link and the anchor-pivot link to move together with the release handle. The anchor-mover link is arranged to interconnect the release handle and the rear shell anchor to cause the first rear shell anchor to move along the anchor-movement line inwardly from the base/stroller-mating position to the base/stroller-releasing position in response to movement of the release handle in a rearward direction away from the seat shell. The anchor-pivot link is arranged to interconnect the release handle and the front shell anchor to cause the front shell anchor to pivot about the anchor-pivot axis in a clockwise direction from the base-mating position to the base-releasing position in response to movement of the release handle in the rearward direction away from the seat shell.

In illustrative embodiments, the rear shell anchor includes a retaining pin and a pin collar. The retaining pin is coupled to the pin collar to move therewith and arranged to extend outwardly through a pin slot formed in the anchor-mover link to engage and mate with the base/stroller-anchor retainer when the rear shell anchor is in the base/stroller-mating position. The retaining pin is arranged to be withdrawn from and lie in spaced-apart relation to the base/stroller-anchor retainer when the rear shell anchor is in the base/stroller-releasing position.

In illustrative embodiments, the anchor-mover link includes a translation beam, a pin mount, and a pin mover. The translation beam is arranged to extend between and interconnect the release handle and the pin mount to cause the pin mount to move with the release handle. The pin mover is appended to the pin mount to move therewith and is arranged to extend away from pin mount toward the pin collar. The anchor-pivot link is appended to the pin mover to lie in spaced-apart relation to the pin mount to move therewith. The translation beam, the pin mount, the pin mover, and the anchor-pivot link move together in response to movement of the release handle relative to the seat shell.

In illustrative embodiments, the pin mount is configured to provide a relatively flat surface that engages with the pin collar when the rear shell anchor is in the base/shell-mating position. The pin mover is configured to provide a ramped surface that engages the pin collar to cause the pin collar to move along the ramped surface and move inwardly as the anchor-mover link moves with the release handle relative to the seat shell.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
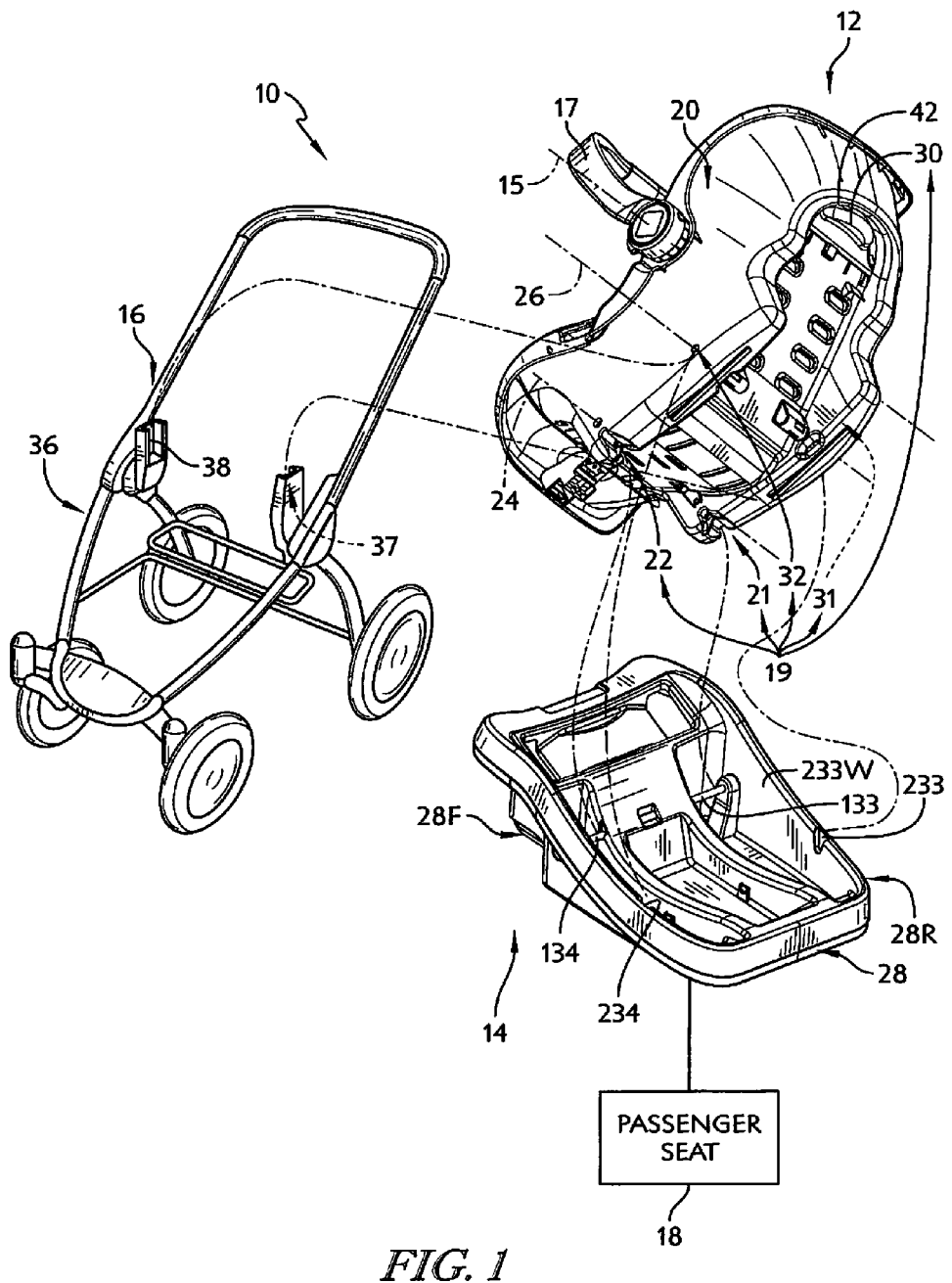
FIG. 1 is a perspective view of a child restraint system showing an infant carrier that is adapted to mate with a base that is placed on a passenger seat in a vehicle or to mate with a stroller frame to provide a juvenile stroller.

An infant carrier 12 is configured to mate with either a base 14 to produce an infant vehicle seat or with a stroller frame 16 to produce a juvenile stroller as suggested in FIG. 1. In a vehicle mode, infant carrier 12 mounts on a base 14 that is held in place on a passenger seat 18 in a vehicle using any suitable means as suggested in FIG. 1. In a stroller mode, infant carrier 12 mounts on stroller frame 16 as suggested in FIG. 1.

Child restraint system 10 includes infant carrier 12, base 14, and stroller frame 16 as shown in FIG. 1. Infant carrier 12 includes a seat shell 20, a carry handle 17, and an anchor system 19. Carry handle 17 is coupled to seat shell 20 to pivot about a handle-pivot axis 15 relative to seat shell 20. Anchor system 19 is configured to selectively couple seat shell 19 to either base 14 or stroller frame 16 at the option of a caregiver.

Anchor system 19 includes an anchor controller 30, two front shell anchors 21, 22 for use only with base 14, and two rear shell anchors 31, 32 for use either with base 14 or with stroller frame 16 as suggested in FIG. 1. Front shell anchors 21, 22 are used to couple seat shell 20 to base 14 as suggested in FIG. 1. Rear shell anchors 31, 32 are used to couple seat shell 20 either to base 14 or to stroller frame 16 as suggested in FIG. 1.

Figure 2:
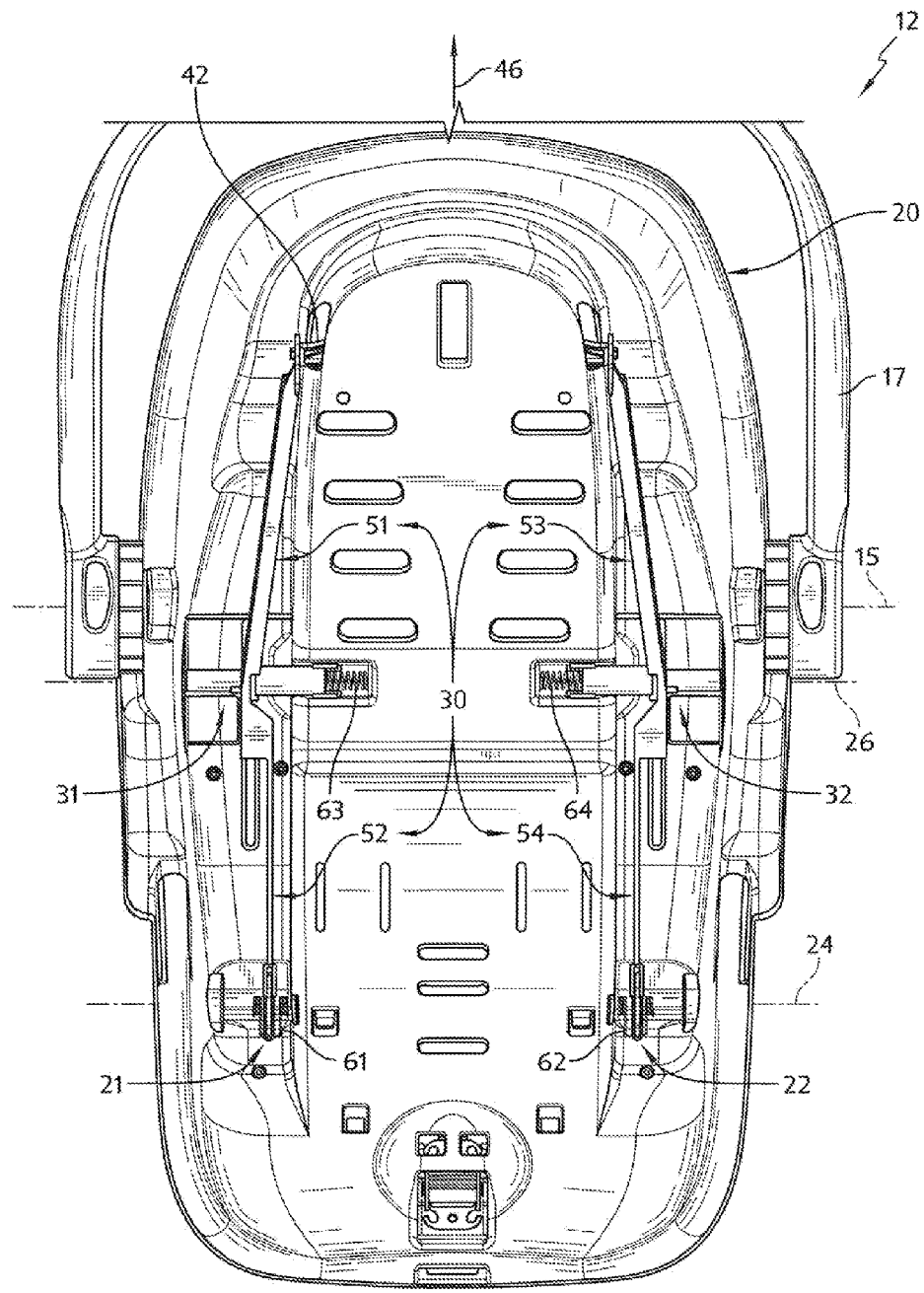
FIG. 2 is top plan view of the infant carrier of FIG. 1 showing an anchor system included in the infant carrier in a locked mode.
Figure 3:
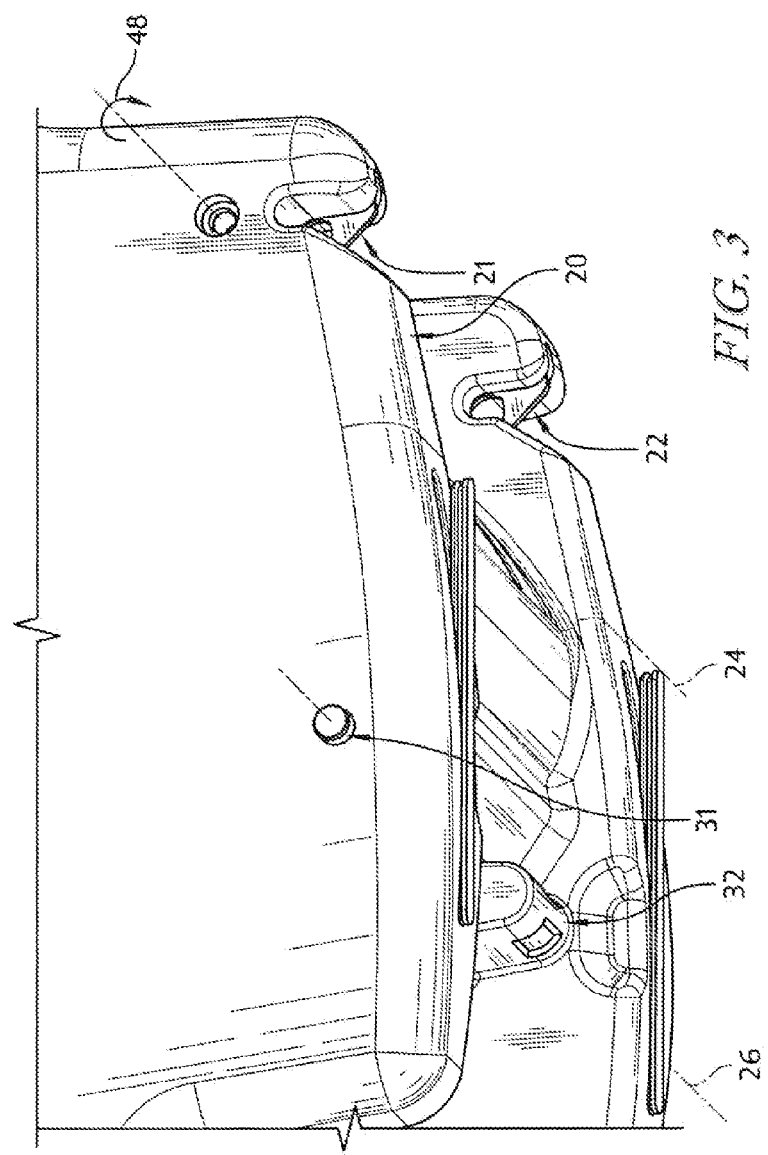
FIG. 3 is a partial perspective view of the infant carrier of FIG. 2 showing a front shell anchor included in the anchor system in a base-mating position and a rear shell anchor included in the anchor system in an extended base/stroller-mating position.
Figure 4:
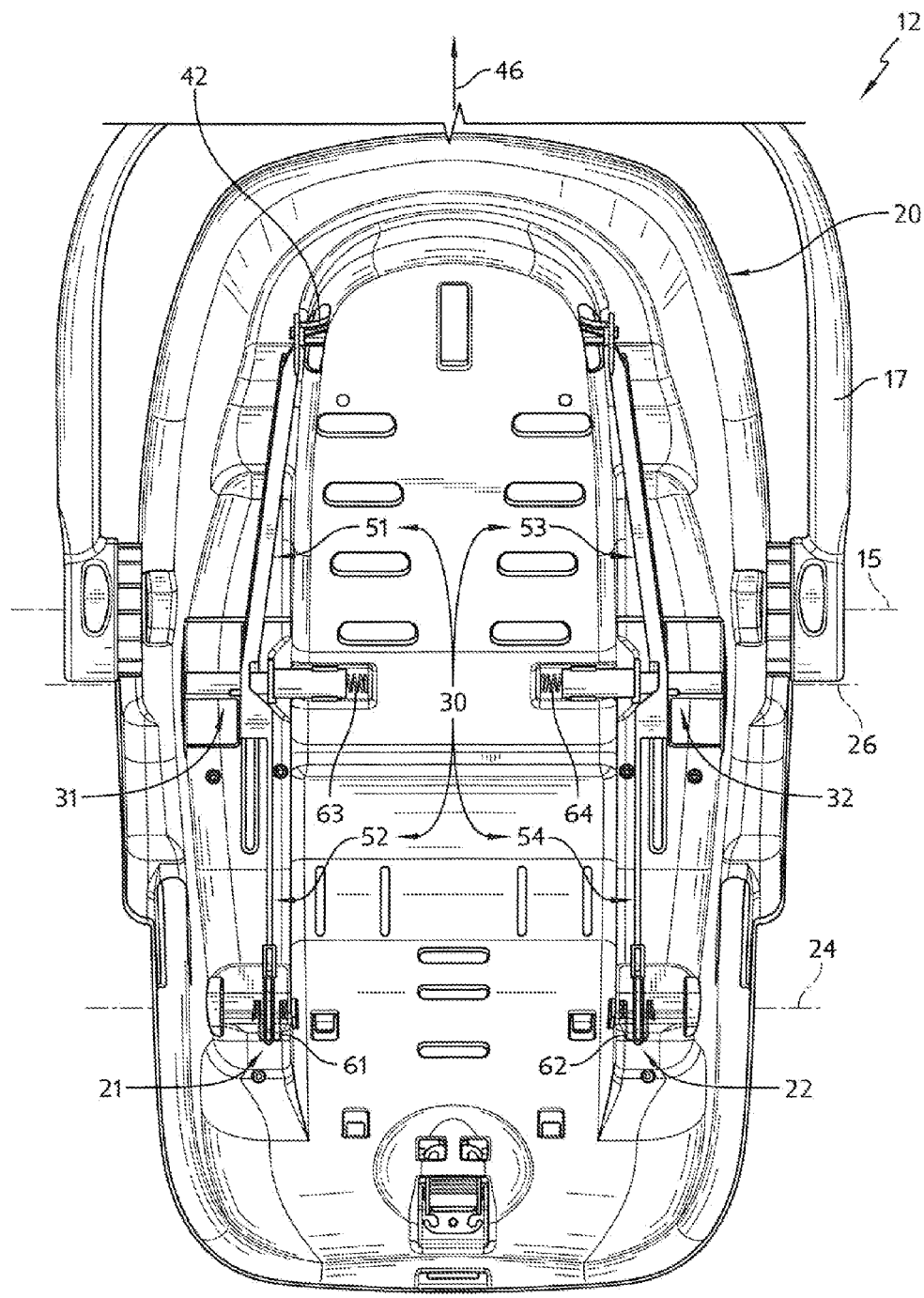
FIG. 4 is a view similar to FIG. 2 showing the anchor system moved to an unlocked mode.

Front shell anchors 21, 22 are coupled to seat shell 20 for pivotable movement about an anchor-pivot axis 24 that extends laterally across seat shell 20 as suggested in FIGS. 2 and 4. Front shell anchors 21, 22 pivot about anchor-pivot axis 24 between a base-mating position shown in FIG. 3 and a base-releasing position shown in FIG. 5 in response to movement of anchor controller 30 relative to seat shell 20.

Rear shell anchors 31, 32 are coupled to seat shell 20 to lie in spaced-apart relation to front shell anchor 21, 22 and are configured to move or translate back and forth along an anchor-movement line 26 that extends laterally across seat shell 20 as suggested in FIGS. 2 and 4. Rear shell anchors 31, 32 move along anchor-movement line 26 relative to seat shell 20 between an extended position shown in FIG. 3 and a retracted position in FIG. 5.

Base 14 includes a foundation 28, a first and second anchor retainers 133, 134 coupled to a forward portion 28F of foundation 28, and first and second anchor receivers 233, 234 formed in a rearward portion 28R of foundation 28 as suggested in FIG. 1. Foundation 28 of base 28 is adapted to set on a passenger seat 18 in a vehicle (not shown) as suggested in FIG. 1. First and second anchor retainers 133, 134 are coupled to foundation 28 to remain in a stationary position and are configured to mate with front shell anchors 21, 22 when seat shell 20 is mounted on base 14 and front shell anchors 21, 22 are in the base-mating positions.

Stroller frame 16 includes a rolling base 36 and a pair of stroller-anchor retainers 37, 38 mounted in stationary positions on rolling base 36 to move therewith as suggested in FIG. 1. Rolling base 36 is adapted to roll on ground underlying rolling base 36. Stroller-anchor retainers 37, 38 are coupled to rolling base 36 and are configured to mate with rear shell anchors 31, 32 when seat shell 20 is mounted on stroller frame 16 and rear anchors 31, 32 are in the base/stroller-mating positions.

Anchor controller 30 of anchor system 19 is configured to provide means for moving both the front shell anchors 21, 22 about anchor-pivot axis 24 and the rear shell anchors 31, 32 along anchor-movement line 26 relative to seat shell 20 at the same time in response to one actuation force (F) so that seat shell 20 is free to be separated from one of base 14 and stroller frame 16 at the option of a caregiver as suggested in FIG. 4. Anchor controller 30 includes a release handle 42, first and second anchor-mover links 51, 53, and first and second anchor-pivot links 52, 54 as suggested in FIGS. 2 and 6. Release handle 42 is coupled to seat shell 20 to move back and forth relative to seat shell 20 between a locked position shown in FIG. 3 and an unlocked position shown in FIG. 5.

First anchor-mover link 51 is arranged to interconnect release handle 42 and first rear shell anchor 31 to cause first rear shell anchor 31 to move inwardly along anchor-movement line 26 toward second rear shell anchor 32 from the extended position to the retracted position in response to movement of release handle 42 in a rearward direction 46 away from seat shell 20. First anchor-pivot link 52 is arranged to interconnect release handle 42 and first front shell anchor 21 to cause first front shell anchor 21 to pivot about anchor-pivot axis 24 in a clockwise direction 44 from the base-mating position to the base-releasing position in response to movement of release handle 42 relative to seat shell 20 in the rearward direction 46.

Figure 6:
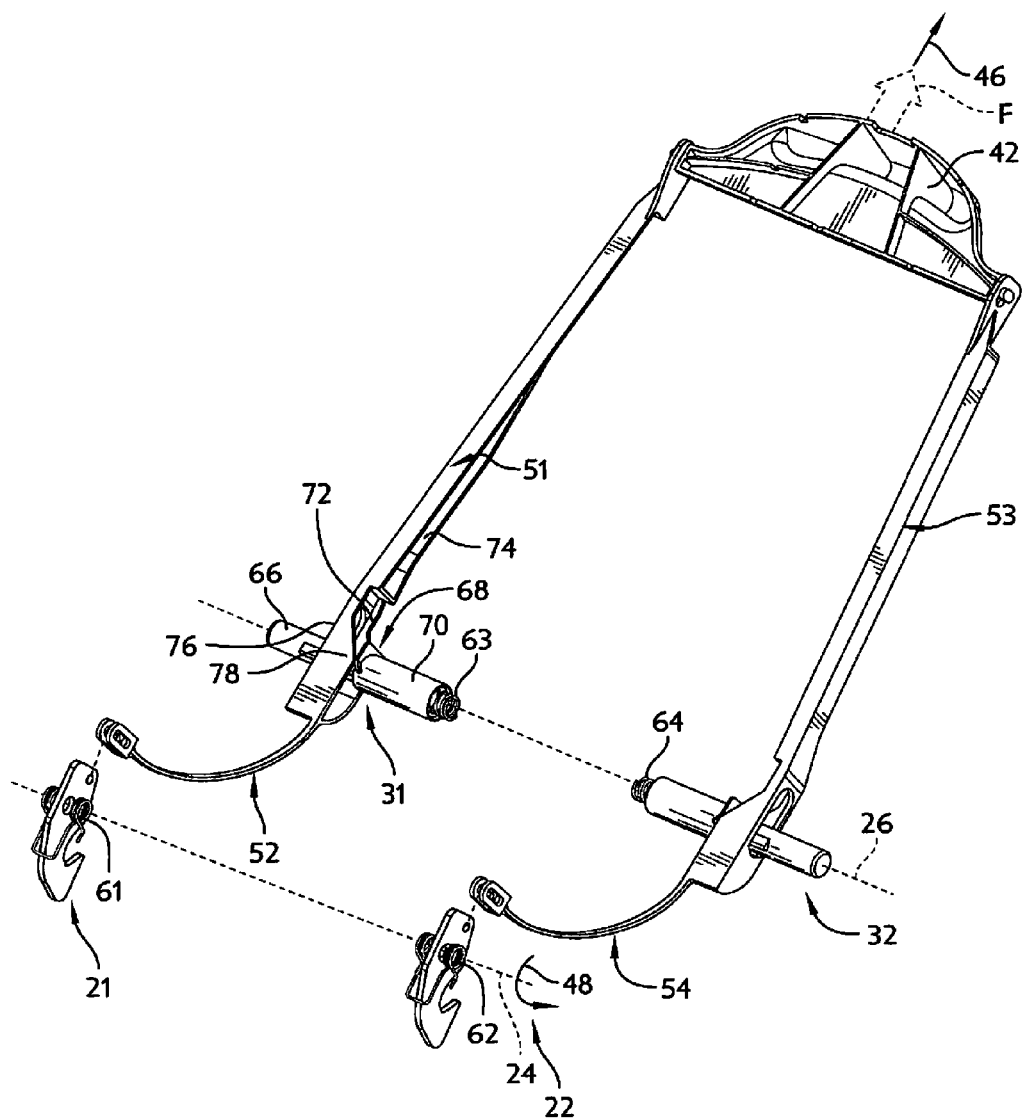
FIG. 6 is a partial perspective view of the anchor system of FIGS. 1-5 showing that the anchor system includes, from top right to bottom left, an anchor controller, first and second rear shell anchors, and first and second front shell anchors.

As shown in FIG. 6, second rear shell anchor 32 is spaced-apart laterally from first rear shell anchor 31. Second anchor-mover link 53 is arranged to interconnect release handle 42 and second rear shell anchor 32 to cause second rear shell anchor 32 to move inwardly along anchor-movement line 26 toward first rear shell anchor 31 from the extended position to the retracted position in response to movement of release handle 42 relative to seat shell 20 in the rearward direction 46.

Second front shell anchor 22 is spaced-apart laterally from first front shell anchor 21 as shown in FIG. 6. Second anchor-pivot link 54 is arranged to interconnect release handle 42 and second front shell anchor 22 to cause second front shell anchor 22 to pivot about anchor-pivot axis 24 in clockwise direction 44 from the base-mating position to the base-releasing position in response to movement of release handle 42 relative to seat shell 20 in the rearward direction 46.

As suggested in FIG. 6, first anchor-pivot link 52 is appended to first anchor-mover link 51 to move therewith. In one example, first anchor-pivot link 52 and first anchor-mover link 51 cooperate to form a monolithic member. In another example, first anchor-mover link 51 is configured to resist deformation and bending while first anchor-pivot link 52 is configured to deform and bend in a predictable manner when the release handle 42 is moved relative to seat shell 20.

As suggested in FIG. 6, second anchor-pivot link 54 is appended to second anchor-mover link 53 to move therewith. In one example, second anchor-pivot link 54 and second anchor-mover link 53 cooperate to form a monolithic member. In another example, second anchor-mover link 53 is configured to resist deformation and bending while second anchor-pivot link 54 is configured to deform and bend in a predictable manner when the release handle 42 is moved relative to seat shell 20.

Figure 5:
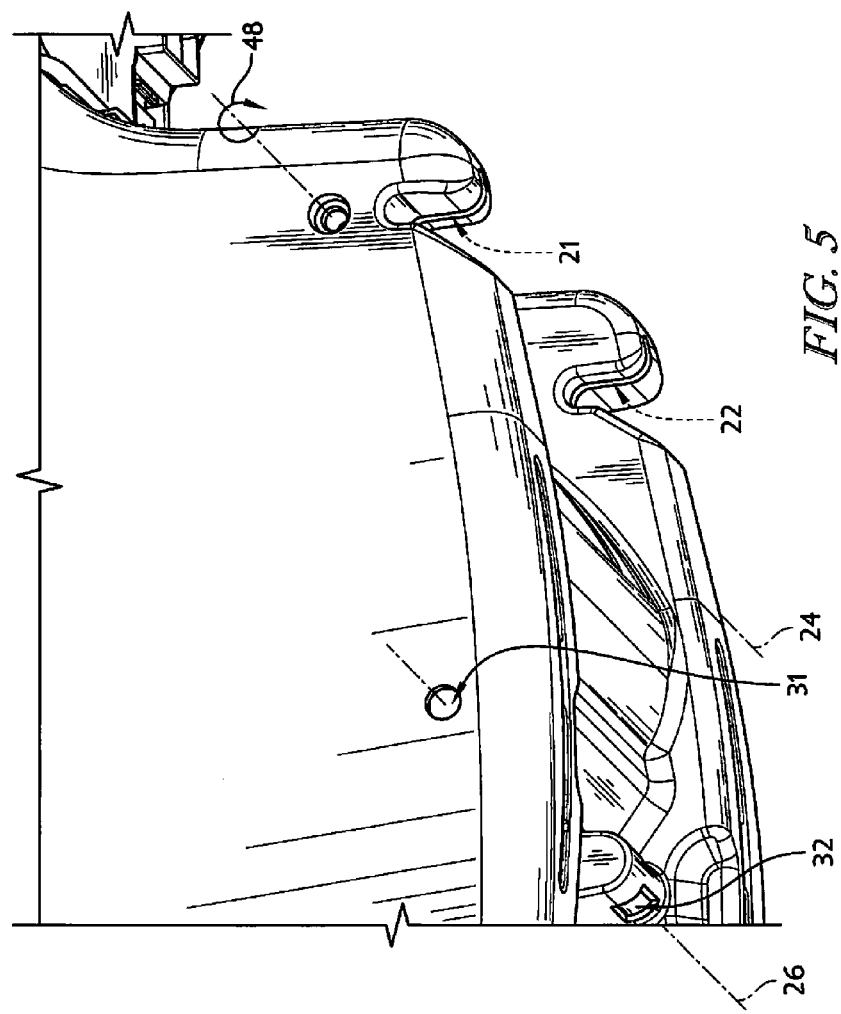
FIG. 5 is a view similar to FIG. 3 showing the front shell anchor included in the anchor system in a base-releasing position and the rear shell anchor included in the anchor system in a retracted base/stroller-releasing position.

A caregiver (not shown) applies an actuation force (F) to release handle 42 to move handle 42 from the locked position shown in FIG. 3 to the unlocked position shown in FIG. 5. Actuation force (F) is sufficient to overcome a set of anchor-bias springs 61, 62, 63, and 64 included in anchor controller 30 as shown in FIG. 6. First anchor-bias spring 61 interconnects seat shell 20 and first front shell anchor 21 to cause first front shell anchor 21 to be biased normally to move in a counterclockwise direction 48 about anchor-pivot axis 24 to assume the base-mating position. Second anchor-bias spring 62 interconnects seat shell 20 and second front shell anchor 22 to cause second front shell anchor 22 to be biased normally to move in counterclockwise direction 48 about anchor-pivot axis 24 to assume and remain in the base-mating position.

Third anchor-bias spring 63 interconnects seat shell 20 and first rear shell anchor 31 to cause first rear shell anchor 31 to be biased normally to move away from second rear shell anchor 32 along anchor-movement line 26 to assume the extended position. Fourth anchor-bias spring 64 interconnects seat shell 20 and second rear anchor 32 to cause second rear anchor 32 to be biased normally to move away from first rear shell anchor 31 along anchor-movement line 26 to assume and remain in the extended position.

Figure 7:
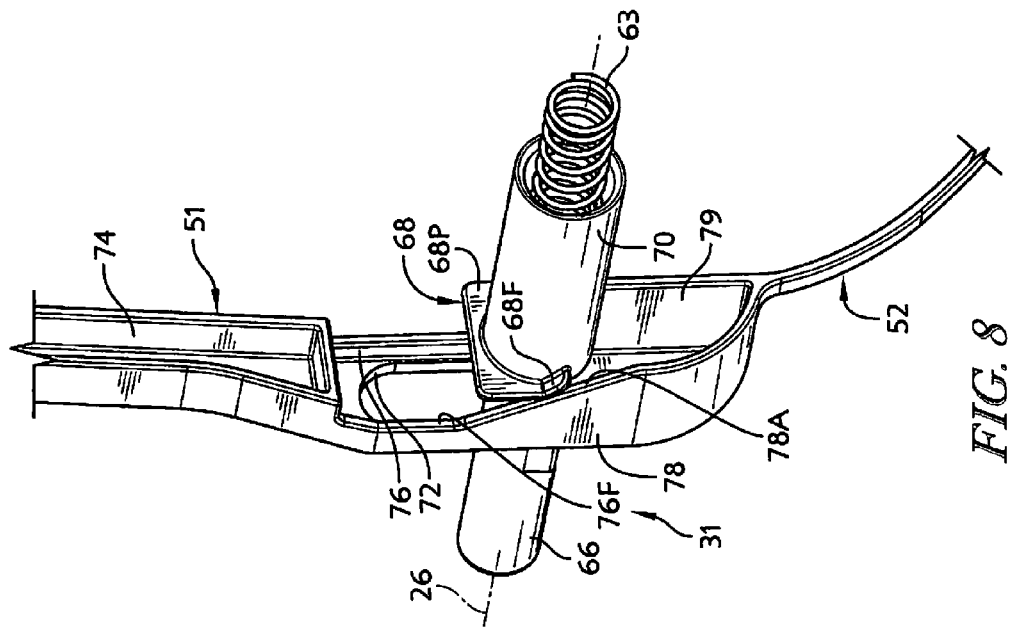
FIG. 7 is an enlarged partial perspective view of the first rear shell anchor included in the anchor system in the extended base/stroller-mating position.

First rear shell anchor 31 is substantially similar to second rear shell anchor 32, and thus, only first rear shell anchor 31 will be discussed in detail. First rear shell anchor 31 includes a retaining pin 66, a pin collar 68, and spring retainer 70 as shown in FIG. 7. Retaining pin 66 is coupled to pin collar 68 and arranged to extend away from second rear shell anchor 32 through a pin slot 72 formed in first anchor-mover link 51 and into a pin passageway formed in the seat shell 20 to engage and mate with a companion stroller-anchor retainer 37 when first rear shell anchor 31 is in the extended position and used to retain the seat shell 20 on the stroller frame 16. When first rear shell anchor 31 is in the retracted position, retaining pin 66 is arranged to be withdrawn from and in spaced-apart relation to the companion stroller-anchor retainer 37. Spring retainer 70 is appended to pin collar 68 and arranged to extend away from pin collar 68 and retaining pin 66 and configured to receive third anchor-bias spring 63 therein.

First anchor-mover link 51 includes a translation beam 74, a pin mount 76, and a pin mover 78 as shown in FIG. 7. Translation beam 74 is arranged to extend between and interconnect release handle 42 and pin mount 76 to cause pin mount 76 to move with release handle 42. Pin mover 78 is appended to pin mount 76 to move therewith and is arranged to extend away from pin mount 76 toward second rear shell anchor 32. First anchor-pivot link 52 is appended to pin mover 78 to lie in spaced-apart relation to pin mount 76 to move therewith. As release handle 42 moves relative to seat shell 20, translation beam 74, pin mount, pin mover 78, and first anchor-pivot link 52 move therewith.

Figure 8:
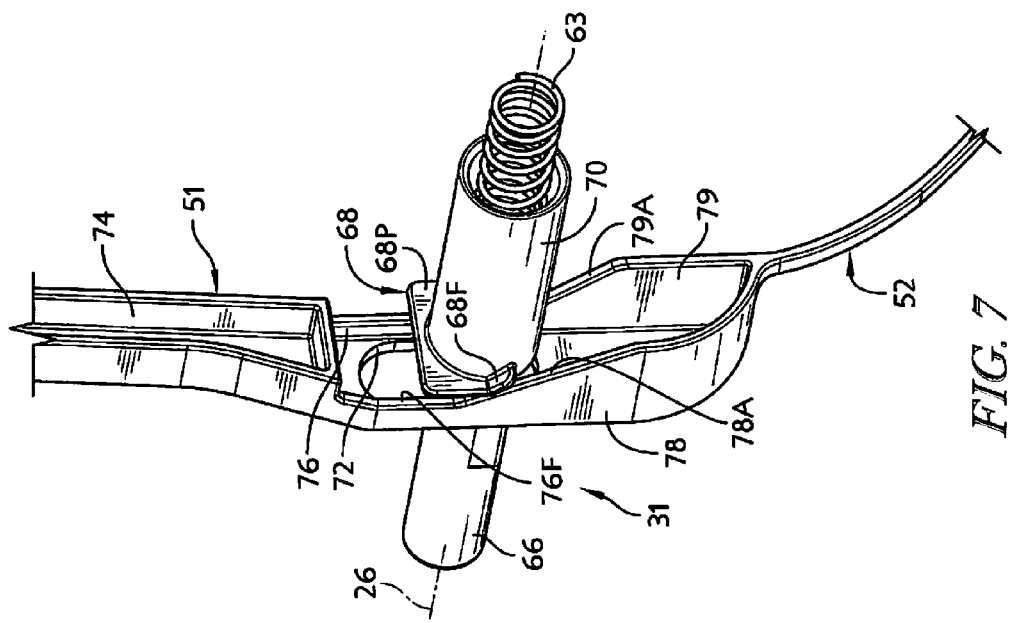
FIG. 8 is a view similar to FIG. 7 showing the first rear shell anchor moved by the anchor controller to the retracted base/stroller-releasing position.

As shown in FIGS. 7 and 8, pin mount 76 is formed to include pin slot 72 therein. Pin mount 76 is configured to provide a relatively flat surface 76F that engages with pin collar 68 when first rear shell anchor 31 is in the extended position. As a result, retaining pin 66 is arranged to extend out of seat shell 20 and engage stroller-anchor retainer 37 of stroller frame 16.

Pin mover 78 is illustratively a ramp providing a ramped surface 78A as shown in FIGS. 7 and 8. As first anchor-mover link 51 moves away from first and second front anchors 21, 22, pin mover 78 engages pin collar 68 to cause pin collar 78 to move along ramped surface 78 and move inwardly toward second rear shell anchor 32 as suggested in FIGS. 7 and 8. Once actuator force (F) is removed, anchor-bias spring 63 normally urges pin collar 68 to slide back down ramped surface 78 and cause release handle 42 to move relative to seat shell 20 to return to the locked position. Pin collar 68 includes a plate 68P and a ramp follower 68F as shown, for example, in FIG. 3. Ramp follower 68F is arranged to ride on ramp 78A as shown, for example, in FIGS. 7 and 8.

When first rear shell anchor 31 is in the extended position and seat shell 20 is coupled to stroller frame 16, retaining pin 66 is arranged to extend through the pin passageway formed in the seat shell 20 to engage and mate with the companion stroller-anchor retainer 37 of stroller frame 16. When first rear shell anchor 31 is in the retracted position in the stroller mode, retaining pin 66 is arranged to be withdrawn from and lie in spaced-apart relation to the companion stroller-anchor retainer 37 of stroller frame.

When first rear shell anchor 31 is in the engaged position and seat shell 20 is coupled to base 14, retaining pin 66 is arranged to extend through the pin passageway formed in the seat shell 20 to engage and mater with a side wall 233W included in base 14 and extend into second anchor receiver 233 formed in that side wall 233W. When first rear shell anchor 31 is in the retracted position in the vehicle mode, retaining pin 66 is arranged to be withdrawn from and lie in spaced-apart relation to the second anchor receiver 233 formed in that side wall 233W.

The invention claimed is:

1. A child restraint system comprising
   a base including a foundation adapted to set on a passenger seat in a vehicle and an anchor retainer coupled to the foundation to lie in a stationary position on the foundation, and
   an infant carrier including a seat shell, a front shell anchor coupled to the seat shell for pivotable movement about an anchor-pivot axis relative to the seat shell between a base-mating position engaged to the anchor retainer and a base-releasing position disengaged from the anchor retainer, and a rear shell anchor coupled to the seat shell and spaced-apart from the front shell anchor and configured to move along an anchor-movement line relative to the seat shell between an extended position and a retracted position, and
   an anchor controller coupled to the seat shell to move back and forth relative to the seat shell between a locked position in which the front shell anchor is in the base-mating position and the rear shell anchor is in the extended position and an unlocked position in which the front shell anchor is in the base-releasing position and the rear shell anchor is in the retracted position,
   wherein the anchor controller includes a release handle, an anchor-mover link arranged to interconnect the release handle and the rear shell anchor to cause the rear shell anchor to move relative to the seat shell inwardly along the anchor-movement line from the extended position to the retracted position in response to movement of the release handle in a rearward direction away from the seat shell, and an anchor-pivot link coupled to the anchor-mover link and to the front shell anchor and arranged to cause the front shell anchor to pivot about the anchor-pivot axis in a clockwise direction from the base-mating position to the base-releasing position in response to movement of the release handle in the rearward direction away from the seat shell and movement of the anchor-mover link relative to the seat shell.

2. The child restraint system of claim 1, further comprising a stroller frame including a rolling base and a stroller-anchor retainer arranged to lie in a stationary position relative to the rolling base and wherein the rear shell anchor interconnects the seat shell and the stroller-anchor retainer when the seat shell is mounted on the stroller frame and the rear shell anchor is moved to assume the extended position and arranged to engage the stroller-anchor retainer of the stroller frame.

3. The child restraint of claim 2, wherein the anchor-mover link is substantially rigid and configured to resist deformation in response to application of an actuation force to the release handle sufficient to cause the release handle to move relative to the seat shell in the rearward direction.

4. The child restraint of claim 3, wherein the anchor-pivot link is configured to deform in response to application of the actuation force to the release handle.

5. The child restraint of claim 2, wherein the rear shell anchor includes a retaining pin and a pin collar, the retaining pin is coupled to the pin collar to move therewith, and the retaining pin is arranged to extend outwardly from the pin collar through a pin slot formed in the anchor-mover link to engage and mate with the stroller-anchor retainer of the stroller when the rear shell anchor is in the extended position and arranged to be withdrawn from and in spaced-apart relation to the stroller-anchor retainer of the stroller when the rear shell anchor is in the retracted position.

6. The child restraint of claim 5, wherein the anchor-mover link is configured to include a first ramped surface arranged to engage the pin collar of the rear shell anchor and to cause the pin collar to move along the first ramped surface and move inwardly toward the seat shell as the anchor-mover link moves with the release handle relative to the seat shell in the rearward direction.

7. The child restraint of claim 6, wherein the first ramped surface of the anchor-mover link is arranged to face toward the seat shell.

8. The child restraint of claim 6, wherein the anchor-mover link is configured to include a second ramped surface arranged to lie in laterally spaced-apart relation to the first ramped surface and arranged to engage the pin collar of the rear shell anchor and to cause the pin collar also to move along the second ramped surface and move inwardly toward the seat shell as the anchor-mover link moves with the release handle relative to the seat shell in the rearward direction.

9. The child restraint of claim 8, wherein the anchor-mover link includes a first wall including the first ramped surface and a laterally spaced-apart second wall including the second ramped surface and the retaining pin is arranged to lie between and move relative to the first and second walls of the anchor-mover link during movement of the retaining pin relative to the seat shell.

10. The child restraint of claim 5, wherein the anchor-mover link includes a translation beam, a pin mount, and a pin mover, the translation beam is arranged to extend between and interconnect the release handle and the pin mount to cause the pin mount to move relative to the seat shell with the release handle, the pin mover is appended to the pin mount to move therewith and is arranged to extend away from pin mount toward the pin collar, and the anchor-pivot link is coupled to the pin mover to lie in spaced-apart relation to the pin mount to move therewith, and the translation beam, the pin mount, the pin mover, and the anchor-pivot link are arranged to move together relative to the seat shell in response to movement of the release handle.

11. The child restraint of claim 10, wherein the pin mount is configured to include an inwardly facing surface that engages the pin collar when the rear shell anchor is in the extended position and the pin mover is configured to provide a ramped surface that is arranged to engage the pin collar and cause the pin collar to move along the ramped surface and move inwardly toward the seat shell as the anchor-mover link moves relative to the seat shell with the release handle in a rearward direction.

12. A child restraint system comprising
a base adapted to set on a passenger seat in a vehicle,
an infant carrier including a seat shell adapted to be mounted on the base and configured to carry an infant seat therein, the infant carrier further including a front shell anchor coupled to a front portion of the seat shell for pivotable movement about an anchor-pivot axis relative to the seat shell between a base-mating position engaging the base to hold the front portion of the seat shell on the base and a base-release position disengaging the base to free the front portion of the seat shell to be separated from the base, the infant carrier further including a rear shell anchor coupled to the seat shell to lie in spaced-apart relation to the front shell anchor and configured to move laterally along an anchor-movement line relative to the seat shell between an extended position projecting outwardly from the seat shell and a retracted position that is different from the extended position, and
an anchor controller coupled to the seat shell for movement relative to the seat shell between a locked position in which the front shell anchor is in the base-mating position and the rear shell anchor is in the extended position and an unlocked position in which the front shell anchor is in the base-releasing positing and the rear shell anchor is in the retracted position.

13. The child restraint system of claim 12, wherein the base includes a foundation and an anchor retainer coupled to the foundation, the foundation is formed to include an anchor receiver sized and arranged to receive the rear shell anchor therein when the infant carrier is mounted on the base and the rear shell anchor is moved to assume the extended position to limit motion of the infant carrier relative to the foundation of the base, and the anchor retainer is arranged to engage the front shell anchor to block removal of the infant carrier from the base when the infant carrier is mounted on the base and the front shell anchor is moved to the base-mating position.

14. The child restraint system of claim 13, wherein the foundation includes a forward portion coupled to the anchor retainer and arranged to lie under a seat bottom included in the infant carrier when the infant carrier is mounted on the base, the foundation also includes a rearward portion formed to include the anchor receiver and arranged to lie under a seat back included in the infant carrier when the infant carrier is mounted on the base.

15. The child restraint system of claim 14, wherein the rearward portion of the foundation includes an upright interior surface, an upright exterior surface, and a top surface arranged to extend laterally between the upright interior and exterior surfaces, and the anchor retainer is defined by a notch formed in the rearward portion of the foundation to have a side opening formed in the upright interior surface and a top opening formed in the top surface.

16. The child restraint system of claim 12, wherein the anchor controller includes a release handle and an anchor-mover link arranged to interconnect the release handle and the rear shell anchor to cause the rear shell anchor to move relative to the seat shell inwardly along the anchor-movement line from the extended position to the retracted position in response to movement of the release handle in a rearward direction away from the seat shell.

17. The child restraint system of claim 16, wherein the rear shell anchor includes a retaining pin and a pin collar, the retaining pin is coupled to the pin collar to move therewith, and the retaining pin is arranged to extend outwardly from the pin collar through a pin slot formed in the anchor-mover link to engage and mate with the stroller-anchor retainer of the stroller when the rear shell anchor is in the extended position and arranged to be withdrawn from and in spaced-apart relation to the stroller-anchor retainer of the stroller when the rear shell anchor is in the retracted position.

18. The child restraint system of claim 17, wherein the anchor-mover link is configured to include a first ramped surface arranged to engage the pin collar of the rear shell anchor and to cause the pin collar to move along the first ramped surface and move inwardly toward the seat shell as the anchor-mover link moves with the release handle relative to the seat shell in the rearward direction.

19. The child restraint system of claim 18, wherein the first ramped surface of the anchor-mover link is arranged to face toward the seat shell.

20. The child restraint system of claim 18, wherein the anchor-mover link is configured to include a second ramped surface arranged to lie in laterally spaced-apart relation to the first ramped surface and arranged to engage the pin collar of the rear shell anchor and to cause the pin collar also to move along the second ramped surface and move inwardly toward the seat shell as the anchor-mover link moves with the release handle relative to the seat shell in the rearward direction.

21. The child restraint system of claim 20, wherein the anchor-mover link includes a first wall including the first ramped surface and a laterally spaced-apart second wall including the second ramped surface and the retaining pin is arranged to lie between and move relative to the first and second walls of the anchor-mover link during movement of the retaining pin relative to the seat shell.

22. The child restraint system of claim 17, wherein the anchor controller further includes an anchor-pivot link coupled to the anchor-mover link and to the front shell anchor, the anchor-mover link includes a translation beam, a pin mount, and a pin mover, the translation beam is arranged to extend between and interconnect the release handle and the pin mount to cause the pin mount to move relative to the seat shell with the release handle, the pin mover is appended to the pin mount to move therewith and is arranged to extend away from pin mount toward the pin collar, and the anchor-pivot link is coupled to the pin mover to lie in spaced-apart relation to the pin mount to move therewith, and the translation beam, the pin mount, the pin mover, and the anchor-pivot link are arranged to move together relative to the seat shell in response to movement of the release handle.

23. The child restraint system of claim 22, wherein the pin mount is configured to include an inwardly facing surface that engages the pin collar when the rear shell anchor is in the extended position and the pin mover is configured to provide a ramped surface that is arranged to engage the pin collar and cause the pin collar to move along the ramped surface and move inwardly toward the seat shell as the anchor-mover link moves relative to the seat shell with the release handle in a rearward direction.

24. The child restraint system of claim 22, wherein the anchor controller further includes an anchor-pivot link coupled to the anchor-mover link and to the front shell anchor, the anchor-mover link is substantially rigid and configured to resist deformation in response to application of an actuation force to the release handle sufficient to cause the release handle to move relative to the seat shell in the rearward direction and the anchor-pivot link is configured to deform in response to application of the actuation force to the release handle.

* * * * *